United States Patent
Suzuki et al.

[19]

[11] Patent Number: 6,136,183
[45] Date of Patent: *Oct. 24, 2000

[54] RELIEF VALVE FOR FILTER DEVICE

[75] Inventors: Yasuyoshi Suzuki, Chiryu; Keizo Funae, Anjo; Shuji Yamaguchi, Toyokawa; Kouichi Tomitaka, Anjo, all of Japan

[73] Assignee: Denso Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/064,788

[22] Filed: Apr. 23, 1998

[30] Foreign Application Priority Data

Apr. 24, 1997 [JP] Japan .................................. 9-107222

[51] Int. Cl.[7] ........................ B01D 35/147; B01D 35/153
[52] U.S. Cl. ........................ 210/130; 210/136; 210/428; 210/440; 137/512.4
[58] Field of Search .................... 210/130, 136, 210/428, 440; 137/512.4, 859

[56] References Cited

U.S. PATENT DOCUMENTS

| | | | |
|---|---|---|---|
| 3,567,023 | 3/1971 | Buckman et al. | 210/130 |
| 3,640,390 | 2/1972 | Goy et al. | |
| 3,785,491 | 1/1974 | Dudinec et al. | 210/130 |
| 4,144,168 | 3/1979 | Thornton . | |
| 5,114,572 | 5/1992 | Hunter et al. . | |
| 5,405,527 | 4/1995 | Covington . | |
| 5,876,600 | 3/1999 | Matsubara et al. . | |

FOREIGN PATENT DOCUMENTS

| | | |
|---|---|---|
| 0607563 A2 | 7/1994 | European Pat. Off. . |
| 60-140606 | 9/1985 | Japan . |
| 1-35215 | 10/1989 | Japan . |
| 6-85007 | 12/1994 | Japan . |
| 8-135428 | 5/1996 | Japan . |
| 8-164307 | 6/1996 | Japan . |
| 1296051 | 11/1972 | United Kingdom . |
| 2137000 | 9/1984 | United Kingdom . |
| WO 93/14858 | 8/1993 | WIPO . |

OTHER PUBLICATIONS

Hiroshi Morishita, "Oil Filter", *Journal of Nippondenso Technical Disclosure*, No. 102–008, May 15, 1995.

*Primary Examiner*—Matthew O. Savage
*Attorney, Agent, or Firm*—Nixon & Vanderhye PC

[57] ABSTRACT

A relief valve for an oil filter device integrally formed with a check valve has an annular shape, and has a front end portion, a guiding portion, a sealing portion, a recess portion, and a groove portion. The relief valve is attached to a protector only by inserting a cylindrical protector end portion into the groove portion thereof. At this time, the recess portion is elastically deformed so that the sealing portion moves inwardly, while the sealing portion is elastically compressed by the protector end portion. As a result, the relief valve closes an oil flow passage defined in a wall of the protector end portion only by an elastic deformation stress thereof. The relief valve can be readily molded and attached to the oil filter device and stably provide desired valve opening characteristics.

32 Claims, 2 Drawing Sheets

6,136,183

RELIEF VALVE FOR FILTER DEVICE

CROSS REFERENCE TO RELATED APPLICATION

This application is based upon and claims the benefit of priority of the prior Japanese Patent Application No. 9-107222 filed on Apr. 24, 1997, the contents of which are incorporated herein by reference.

BACKGROUND OF THE INVENTION

1. Field of the Invention

The present invention relates to a relief valve for allowing or preventing a fluid flow in a passage and to a method for attaching the same. The present invention also relates to a filter device adopting the relief valve.

2. Related Art

Conventionally, an oil filter device includes a relief valve for allowing oil to bypass a filter element retained in the device when the filter element deteriorates due to some problems such as clogging. This kind of oil filter device is disclosed, for example, in JP-Y2-1-35215, in which the relief valve uses a plurality of openings provided in a cylindrical end plate attached to a lower portion of the filter element.

However, in JP-Y2-1-35215, the relief valve is disposed between the cylindrical end plate and a cylindrical portion of a reinforcing plate with a pushing stress in a radial direction thereof. Further, when the relief valve is elastically deformed to open or close the openings, a deformation stress is applied to the same portion of the relief valve as the pushing stress. Because of this, the relief valve tends to be readily broken. Furthermore, the pushing stress easily varies due to some factors such as a dimension error and an attachment error of the reinforcing plate. The variation in the pushing stress applied to the relief valve adversely affects a valve opening pressure of the relief valve. Therefore, accurate attachment is required, resulting in a low attachment workability.

SUMMARY OF THE INVENTION

It is a first object of the present invention to improve attachment workability of a relief valve to a filter device. It is a second object of the present invention to prevent stress from concentrating on the same point of a relief valve. It is a third object of the present invention to provide a filter device including a relief valve capable of being easily attached to the filter device.

To achieve the first object of the present invention, a relief valve for closing and opening a fluid passage defined in a wall of a cylindrical attachment member includes a sealing portion and a front end portion. The sealing portion is elastically deformed to contact the attachment member or to be separated from the attachment member when the fluid passage is closed or is opened. The front end portion can be fitted with an opened front end of the attachment member with a gap therebetween.

Specifically, when the relief valve is attached to an inner surface of the attachment member, an outer diameter of the front end portion of the relief valve is smaller than an inner diameter of the front end of the attachment member, and an outer diameter of the sealing portion is larger than the inner diameter of the attachment member. When the relief valve is attached to an outer surface of the attachment member, an inner diameter of the front end portion of the relief valve is larger than an outer diameter of the front end of the attachment member and an inner diameter of the sealing portion is smaller than the outer diameter of the attachment member. Accordingly, the relief valve can be easily attached to the attachment member, and securely close the fluid passage. Preferably, the relief valve has a sloped guiding portion between the front end portion and the sealing portion to make the attachment of the relief valve easier.

To achieve the second object of the present invention, a relief valve is integrally formed with a sealing portion, a fixed end portion, and a recess portion provided between the sealing portion and the fixed end portion. The recess portion is elastically deformed to move the sealing portion. Accordingly, the sealing portion contacts an attachment member when a fluid passage defined in a wall of the attachment member is closed, and is separated from the attachment member when the fluid passage is opened. The fixed end portion fixes the attachment member thereon. Accordingly, it is prevented that a large stress is concentrated on the same point of the relief valve. Specifically, an elastic deformation stress is prevented from concentrating on the fixed end portion fixing the attachment member.

To achieve the third object of the present invention, a generally cylindrical attachment member with first and second end openings has a diameter substantially constant or enlarged from the first end opening to the second end opening. Further, the attachment member has a first fluid passage between the first and second end openings and a second fluid passage defined in its wall adjacent to the second end opening. A relief valve is attached to the attachment member on a second end opening side to close the second fluid passage. Due to the shape of the attachment member, the relief valve can be easily attached to the attachment member and provide desired valve opening characteristics.

BRIEF DESCRIPTION OF THE DRAWINGS

These and other objects and features of the present invention will become more readily apparent from a better understanding of a preferred embodiment described below with reference to the accompanying drawings, in which.

DETAILED DESCRIPTION OF THE PREFERRED EMBODIMENT

Figure 1:
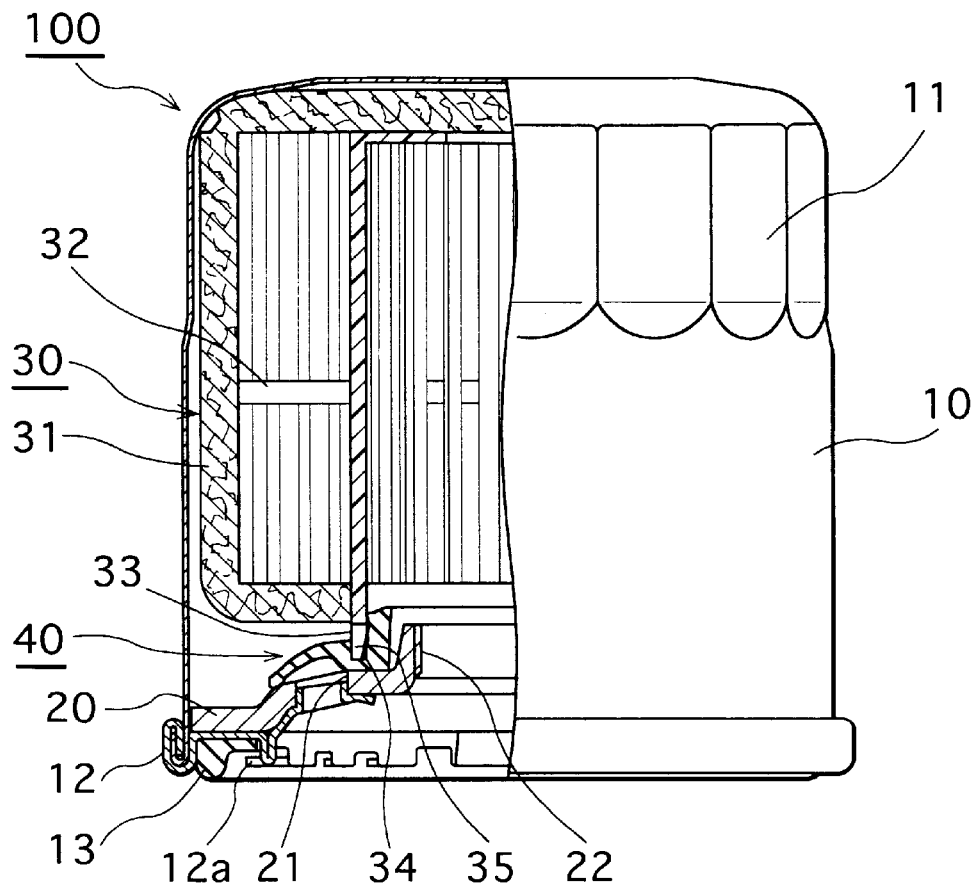
FIG. 1 is a partially cross-sectional view showing an oil filter device according to a preferred embodiment of the present invention.

A preferred embodiment of the present invention will be described hereinafter with reference to FIGS. 1–4B. As shown in FIG. 1, a spin-on type oil filter device 100 for an internal combustion engine has a casing composed of a filter case 10, a bottom plate 12, and a reinforcing plate 20, which are made of metal. The filter case 10 is formed into a cylinder with a bottom and has a polygonal portion 11. The polygonal portion 11 is for fitting a specific tool that is used to mount or dismount the oil filter device 100. On an opening end of the filter case 10, the bottom plate 12 is disposed to be unified with the filter case 10. Specifically, an outer peripheral rim of the bottom plate 12 is rolled involving a rim of the opening end of the filter case 10 and is caulked with the filter case 10. The reinforcing plate 20 is fitted to an inner surface of the bottom plate 12.

The filter case 10 accommodates a filter element sub-assembly (hereinafter referred to as element S/A) 30. The element S/A 30 is composed of a protector 32 made of plastic resin and a filter element 31 made of nonwoven fabric and disposed around the protector 32 with a predetermined thickness. The protector 32, which partitions the inside of the filter case 10, is molded into a substantially cylindrical shape having a plurality of comb teeth in a vertical direction in FIG. 1. The filter element 31 is formed around the protector 32 by suction using the protector 32 as a wick member.

The protector 32 has a cylindrical protector end portion (attachment member) 33 which protrudes downward from the filter element 31. The protector end portion 33 has an insertion portion 34 at a front end portion thereof. The insertion portion 34 has a tapered inner surface, which is inclined to extend along a guiding slope of a guiding portion 44 of a relief valve 40 (described later) when the insertion portion 34 is inserted into the relief valve 40. The tapered inner surface of the insertion portion 34 may be part of sphericity. Further, a plurality of slits are provided in the protector end portion 33 with a comb-teeth shape to encircle the protector end portion 33, providing oil flow passages 35. The shape of the oil flow passages 35 is not limited to that, and the oil flow passages 35 may be formed by holes provided in the protector end portion 33.

The protector end portion 33 is disposed on an inner surface of the reinforcing plate 20 through the relief valve 40. The relief valve 40 on the inner surface of the reinforcing plate 20 is elastically deformed at a predetermined dimension by a pushing force derived from the filter element 31 and the protector 32. This makes the element S/A 30 fluid-tight.

The reinforcing plate 20 has several oil inlets 21 at an inner circumference side. An oil outlet 22 is formed at a center of the reinforcing plate 20 so as to protrude inwardly by deforming the inmost portion of the reinforcing plate 20 by a burring method. An inner surface of the oil outlet 22 is threaded to serve as a screw for securing the spin-on type filter device 100. The bottom plate 12 is attached to the reinforcing plate 20 by being partially fitted into the oil inlets 21, and has a pawl portion 12a for holding a gasket 13 made of rubber on an outside of the casing. In the above-mentioned embodiment, the oil outlet 22 is formed so as to protrude inwardly; however, the oil outlet 22 maybe formed so as to protrude outwardly.

Figure 2:
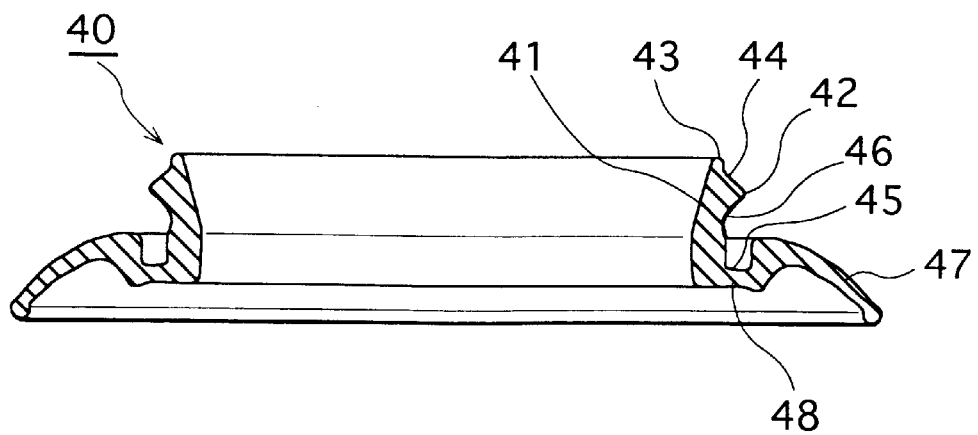
FIG. 2 is a cross-sectional view showing a relief valve according to the embodiment.

Next, the relief valve 40 is described in more detail with reference to FIG. 2.

The relief valve 40 is made of rubber and integrally formed with the groove portion (fixed end portion) 45 for receiving the protector end portion 33, a relief valve portion 41 provided at an inner circumference side of the groove portion 45, and a check valve portion 47 provided at an outer circumference side of the groove portion 45. The relief valve portion (cylindrical wall) 41 has an annular sealing portion (protruding portion; annular protrusion) 42 protruding radially outwardly with respect to a center axis of the valve portion, an annular front end portion 43 with an outer diameter smaller than that of the sealing portion 42 at a front end side of the sealing portion 42 and a guiding portion 44 having a guiding slope between the front end portion 43 and the sealing portion 42. Further, an annular recess portion 46 is provided on the radially outer surface of relief valve portion 41 between the sealing portion 42 and a groove bottom 48 of the groove portion 45. Because a thickness of the recess portion 46 is thinner than the other portion of the relief valve portion 41, the recess portion 46 is deformed readily. The check valve portion 47 of the relief valve 40 is to cover the oil inlets 21 with an oil passage to allow oil to flow into the oil filter device 100 through the oil inlets 21, and to prevent oil from returning from inside to outside of the oil filter device 100 through the oil inlets 21.

Next, a process for assembling the protector 32 and the relief valve 40 in the oil filter device 100 is described with reference to FIGS. 3A and 3B.

Figure 3A:
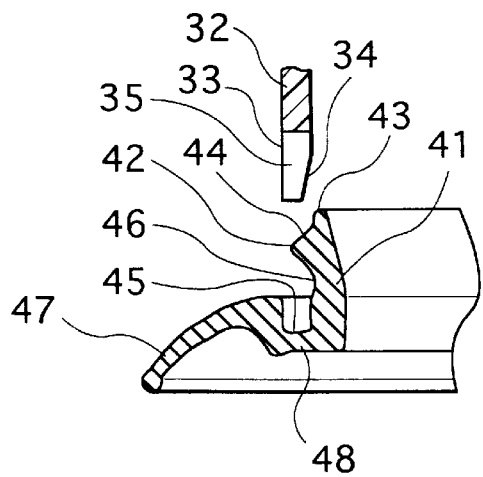
FIG. 3A is a cross-sectional view partially showing the relief valve and a protector of the oil filter device before attachment.

As shown in FIG. 3A, the protector end portion 33 of the protector 32 is set to face the front end portion 43 of the relief valve 40. The outer diameter of the front end portion 43 of the relief valve 40 is smaller than an inner diameter of the insertion portion 34 of the protector 32. As mentioned above, the insertion portion 34 has the tapered inner surface, and the inclined direction of the tapered inner surface corresponds to the inclined direction of the guiding slope of the guiding portion 44 in the state shown in FIG. 3A.

When inserting the protector 32 into the relief valve 40, the insertion portion 34 of the protector 32 is received by the front end portion 43 of the relief valve 40 defining a gap therebetween, and then moves along the guiding portion 44 while the tapered inner surface of the insertion portion 34 pushes the guiding slope of the guiding portion 44. At that time, the tapered inner surface of the insertion portion 34 makes the protector end portion 33 easy to be inserted into the relief valve 40. The outer diameter of the sealing portion 42 is larger than the inner diameter of the insertion portion 44. Therefore, the sealing portion 42 is elastically deformed inwardly to extend along the tapered inner surface of the insertion portion 34.

Figure 3B:
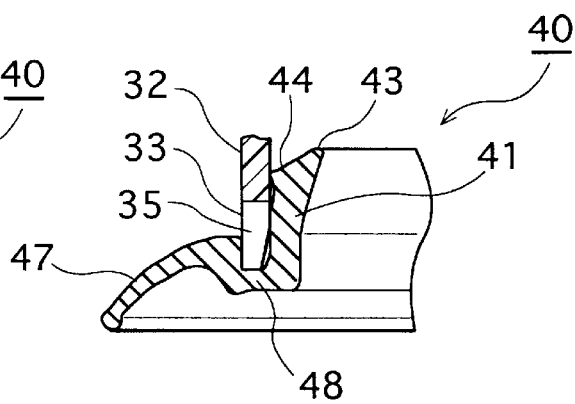
FIG. 3B is a cross-sectional view partially showing the relief valve and the protector after attachment.

Then, as shown in FIG. 3B, the protector 32 is fully inserted into the groove portion 45 of the relief valve 40 so that the protector end portion 33 abuts the groove bottom 48 of the relief valve 40. In this state, the oil flow passages 35 of the protector 32 are covered by the relief valve portion 41 of the relief valve 40 to prevent fluid from passing through the oil flow passages 35. The recess portion 46 is elastically deformed so that a front end side of the relief valve portion 41 with respect to the recess portion 46 is bent inwardly around the recess portion 46. At the same time, the sealing portion 42 is elastically compressed to push the inner surface of the protector end portion 33 on an upper side of the oil flow passages 35. Then, the protector 32 and the relief valve 40 assembled as described above are accommodated in the filter case 10 as shown in FIG. 1.

Figure 4A:
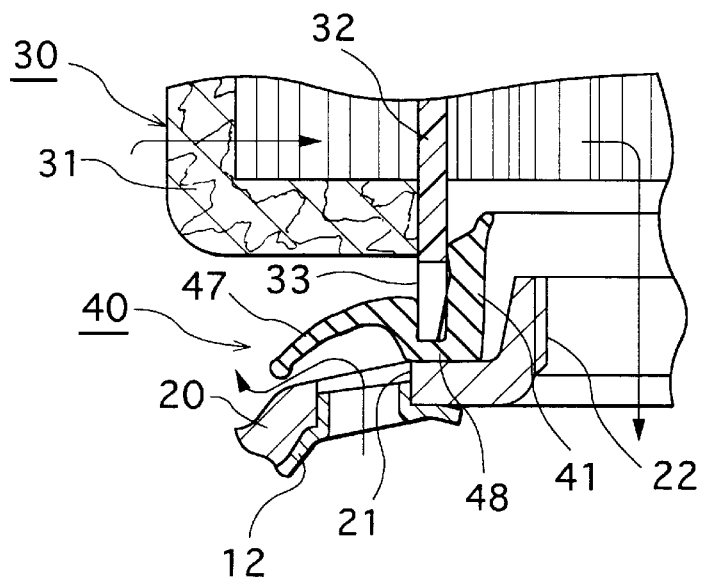
FIG. 4A is a cross-sectional view partially showing the oil filter device in which the relief valve is closed.
Figure 4B:
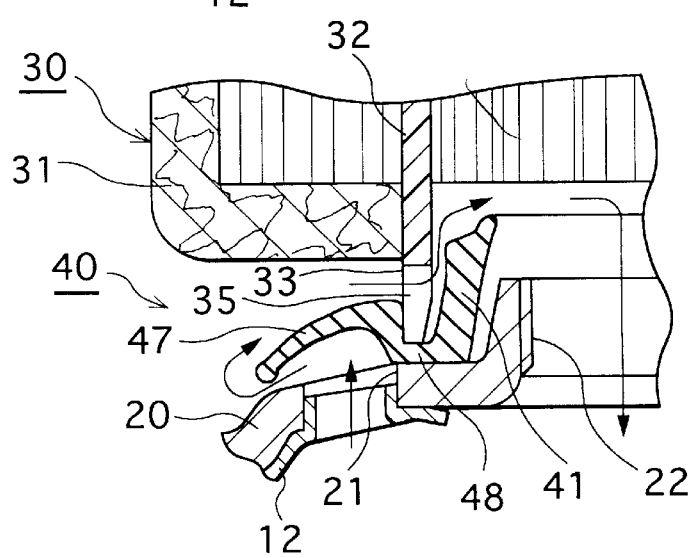
FIG. 4B is a cross-sectional view partially showing the oil filter device in which the relief valve is opened.

The relief valve 40 in the oil filter device 100 operates as follows. FIGS. 4A and 4B respectively show states where a pressure difference between the inside and outside of the element S/A 30 is less and more than a predetermined valve opening pressure.

In either state, the check valve portion 47 allows foul oil coming from the internal combustion engine to be introduced into the oil filter device 100 through the oil inlets 21 in a direction indicated by arrows. When the pressure difference between the inside and outside of the element S/A 30 is less than the predetermined valve opening pressure and when the filter element 31 allows the foul oil to pass therethrough, as shown in FIG. 4A, the foul oil introduced through the oil inlets 21 is filtered by the filter element 31 and then returned to the internal combustion engine side through the oil outlet 22 as filtered oil. However, when the filter element 31 has problems such as clogging or when a viscosity of the foul oil is extremely high, it becomes difficult for the foul oil to pass through the filter element 31. As a result, the pressure difference between the inside and outside of the element S/A 30 increases. When the pressure difference exceeds the predetermined valve opening pressure, the relief valve 40 is elastically deformed inwardly to open the oil flow passages 35 and the foul oil passes through the oil flow passages 35 provided in the protector end portion 33. Therefore, the foul oil is returned to the internal combustion engine side without being filtered by the filter element 31.

The above-mentioned relief valve 40 in this embodiment has the following advantages. First, the relief valve 40 in this embodiment is attached to the protector end portion 33 to allow oil to pass through the oil flow passages 35 only when the pressure difference between the inside and outside of the protector 32 is more than the predetermined valve opening pressure. In this operation, the relief valve 40 in this embodiment can stably provide desired valve opening characteristics.

Further, the relief valve 40 has the groove portion 45 to which the protector end portion 33 is fully inserted to be secured. Therefore, the relief valve 40 can be attached to the oil filter device 100 only by inserting the protector end portion 33 to the groove portion 45. Thus, the relief valve 40 can be easily attached to the oil filter device 100. Further, due to the tapered surface of the protector end portion 33, the protector end portion 33 can be readily inserted into the groove portion 45 of the relief valve 40, resulting in easier attachment of the relief valve 40 to the oil filter device 100.

Furthermore, the relief valve portion 41 of the relief valve 40 has the recess portion 46 between the sealing portion 42 and the groove bottom 48 of the groove portion 45. Therefore, the recess portion 46 is elastically deformed so that the front end side of the relief valve portion 41 with respect to the recess portion 46 is bent inwardly. This prevents a large stress from being concentrated on the groove bottom 48 sandwiched between the protector end portion 33 and the reinforcing plate 20, resulting in high durable reliability of the relief valve 40.

The relief valve 40 is fluid-tightly interposed between the protector 32 and the reinforcing plate 20 of the casing in the oil filter device 100 with the groove bottom 48 serving as a seat portion directly interposed therebetween. Accordingly, sealing capability in the vicinity of the relief valve portion 41 can be ensured. Thus, the relief valve 40 is secured firmly to the casing via the groove bottom 48 without causing elastic deformation of the relief valve portion 41 in a moving direction, i.e., in the radial direction, of the relief valve portion 41. This also leads to stable desired valve opening characteristics.

Further, the groove portion 45, the sealing portion 42 and the recess portion 46 of the relief valve portion 41 are all annular. Therefore, the relief valve 41 can be molded easily at low cost.

In this embodiment, the protector end portion 33 has a generally cylindrical shape which substantially extends with a constant diameter or which is enlarged outwardly. Because of this, the relief valve 40 can be readily attached to the protector end portion 33 only by deforming the relief valve portion 41 in a compressed direction thereof. In this case, the relief valve portion 41 is not deformed excessively. The excessive deformation of the relief valve portion 41 causes variation in deformation of the relief valve portion 41. As opposed to this, the relief valve 40 with the above-mentioned structure can exhibit stable and easy deformation performance and provide a constant valve opening pressure, because it is not excessively deformed. In addition, it is easy for a plurality of relief valves having the above-mentioned structure to be manufactured as products with stable and easy deformation performance and with constant valve opening pressure.

While the present invention has been shown and described with reference to the foregoing preferred embodiment, it will be apparent to those skilled in the art that changes in form and detail may be made therein without departing from the scope of the invention as defined in the appended claims.

For example, in the above-mentioned embodiment, the protector end portion 33 provides the oil flow passages 35 and a wall which the relief valve portion 41 contacts to be elastically deformed; however, the wall which the relief valve portion 41 contacts can be provided by another member other than the protector 32. For example, when the element S/A 30 has an end plate, the end plate can be used in place of the protector end portion 33 of the protector 32.

In the above-mentioned embodiment, the filter element 31 is a molded suction type filter formed by suction using the protector 32 as a wick element; however, the filter element 31 can be made of a folded filter paper. Further, the protector 32 can be made of metal instead of resin. For example, an iron plate formed into a cylinder can be used as the protector 32.

In the above-mentioned embodiment, the protector end portion 33 of the protector 32 is a straight cylinder with a constant diameter or a tapered cylinder, the diameter of which is gradually enlarged as it becomes close to the front end thereof. When the protector end portion 33 is a tapered cylinder, the groove portion 45 of the relief valve portion 41 can be inclined so that the groove portion 45 corresponds to the tapered surface of the protector end portion 33.

In the above-mentioned embodiment, the oil outlet 22 is provided at a center of the reinforcing plate 20 and the oil inlets 21 are provided around the oil outlet 22, and the oil flows from the outside to the inside of the protector 32; however, the oil outlet 22 may be provided on an outer circumference side of the oil inlets 21 on the contrary. That is, the oil may flow from the inside to the outside of the protector 32. In this case, the relief valve portion 41 is disposed to contact the outer surface of the protector end portion 33 of the protector 32 instead of the inner surface of the protector end portion 33.

Variations such as those described above are to be understood as being within the scope of the present invention as defined by the appended claims.

What is claimed is:

1. A relief vale for closing and opening a fluid passage provided in a wall of a generally cylindrical attachment member, the relief valve comprising:

an annular relief valve portion coaxially surrounding a center axis, said relief valve portion having a radially outer surface and having an annular sealing portion protruding radially outwardly from said radially outer surface and with respect to the center axis, wherein the annular relief valve portion can be elastically deformed so that the annular sealing portion can contact the attachment member when the fluid passage is closed and can be separated from the attachment member when the fluid passage is opened; and an annular fixed end portion integrally connected with the relief valve portion for abutting a front end of the attachment member.

2. The relief valve of claim 1, further comprising said attachment member, wherein an outer diameter of the annular sealing portion is larger than an inner diameter of a front end of the attachment member.

3. The relief valve of claim 2, further comprising:
a front end portion integrated with the sealing portion at an opposite side of the sealing portion with respect to the fixed end portion,
the front end portion having an outer diameter smaller than the inner diameter of the attachment member.

4. The relief valve of claim 3, further comprising a guiding portion disposed between the front end portion and the sealing portion and having a surface sloped from the front end portion toward the sealing portion.

5. The relief valve of claim 1, wherein the fixed end portion has an annular groove for receiving the front end of the attachment member.

6. The relief valve of claim 5, further comprising an annular recess portion provided between the sealing portion and the fixed end portion, the recess portion having a thickness thinner than that in a vicinity of the recess portion.

7. The relief valve of claim 1, further comprising an annular recess portion having a recess provided on a radially outer surface of the relief valve portion between the fixed end portion and the sealing portion at an attachment member side for facing the attachment member, the recess having a thickness thinner than that of the annular fixed end portion and the annular sealing portion.

8. The relief valve of claim 7, wherein the recess portion is elastically deformed such that the sealing portion and the front end portion move in a radial direction of the relief valve to close and to open the fluid passage.

9. The relief valve of claim 1, further comprising:
a check valve portion that regulates a flow of fluid so that the fluid flows from outside of the attachment member to inside of the attachment member through the fluid passage when the fluid passage is opened,
the check valve portion being integrally connected with the fixed end portion for being positioned at an opposite side of the sealing portion with respect to the attachment member.

10. The relief valve of claim 1, wherein:
the relief valve has a generally cylindrical wall having a front end portion and an end opposite the fixed end portion; and
the annular sealing portion is provided on a radially outer surface of the cylindrical wall, between the front end portion and the fixed end portion.

11. A relief valve for closing and opening a fluid passage provided in a wall of a generally cylindrical attachment member, the relief valve comprising:
a generally cylindrical wall having a radially outer surface and a radially inner surface with respect to a center axis thereof;
said cylindrical wall having a sealing portion for contacting the attachment member when the fluid passage is closed and for being separated from the attachment member when the fluid passage is opened;
a fixed end portion integrally connected with the cylindrical wall for fixing a front end of the attachment member; and
a recess portion integrally disposed between the sealing portion and the fixed end portion and having a recess on said radial outer surface of the cylindrical wall for facing the attachment member.

12. The relief valve of claim 11, wherein the relief valve, the sealing portion, the fixed end portion, and the recess portion are annular.

13. The relief valve of claim 11, wherein the fixed end portion has a groove for receiving the front end of the attachment member.

14. The relief valve of claim 11, wherein the sealing portion is elastically deformed when the fluid passage is closed and is opened.

15. The relief valve of claim 11, wherein the sealing portion comprises a protruding portion protruding radially outwardly from the radially outer surface of the generally cylindrical wall.

16. The relief valve of claim 15, further comprising:
a front end portion integrated with the sealing portion at a side opposite to the recess portion with respect to the sealing portion,
the front end portion having an outer diameter smaller than that of the inner diameter of the attachment member.

17. The relief valve of claim 16, further comprising:
a guiding portion disposed between the front end portion and the sealing portion and having a surface sloped from the front end portion toward the sealing portion.

18. The relief valve of claim 17, wherein the surface of the guiding portion forms a part of a contour of the protruding portion.

19. The relief valve of claim 11, further comprising:
a check valve portion that prevents fluid from flowing in a passage other than the fluid passage provided in the wall of the attachment member when the fluid passage is opened,
the check valve portion being integrally connected with the fixed end portion for being positioned at an opposite side of the recess and the sealing portion with respect to the attachment member.

20. A device for controlling a fluid flow, comprising:
a generally cylindrical attachment member surrounding a center axis and having a first end opening, a second end opening, a first fluid passage between the first end opening and the second end opening, and a second fluid passage defined in its wall adjacent to the second end opening, the attachment member having an inner diameter substantially constant from the first end opening to the second end opening or enlarged from the first end opening to the second end opening; and
a relief valve attached to an inner surface of the attachment member on a second end opening side to close the second fluid passage, the relief valve having a generally cylindrical wall having a radially outer surface and a radially inner surface with respect to said center axis thereof, said cylindrical wall having an annular sealing portion, and a recess defined on said radially outer surface of the cylindrical wall, wherein the cylindrical wall can be elastically deformed so that the annular sealing portion can contact the inner surface of the attachment member to close the second fluid passage.

21. The device of claim 20, wherein the relief valve has an annular fixed end portion integrally connected with the cylindrical wall and having an annular groove for receiving the attachment member.

22. The device of claim 20, wherein the inner surface of the attachment member on the second end opening side is sloped to have an inner diameter enlarged toward the second end opening.

23. The device of claim 20, further comprising:

a filter member communicating with the first end opening of the attachment member for filtering the fluid flow, wherein the relief valve opens the second fluid passage to allow the fluid flow to bypath the filter member when the pressure difference between the inside and outside of the attachment member exceeds the specific value.

24. The device of claim 20, further comprising a casing for holding the attachment member and the relief valve, wherein the relief valve has a fixed end portion and a relief valve portion that includes said cylindrical wall and said sealing portion and recess thereof, the fixed end portion being fixed between the attachment member and the casing with a stress in a first direction, the relief valve portion elastically deformed with a stress in a second direction to close and to open the second fluid flow passage, the second direction being non-parallel with the first direction.

25. The device of claim 24, wherein:

the casing has a fluid inlet for introducing the fluid flow from outside to inside of the casing; and the relief valve is integrally formed with a check valve for preventing the fluid flow from returning to the outside of the casing through the fluid inlet.

26. The device of claim 20, wherein the sealing portion protrudes radially outwardly from the radially outer surface of the generally cylindrical wall to define a protruding portion, the protruding portion having an outer diameter larger than that of the inner diameter of the attachment member.

27. The device of claim 26, wherein the relief valve has a front end portion at a side opposite to the recess with respect to the protruding portion, the front end portion having an outer diameter smaller than that of the inner diameter of the attachment member.

28. The device of claim 27, wherein the relief valve has a guiding portion disposed between the front end portion and the protruding portion and having a surface sloped from the front end portion toward the protruding portion.

29. The device of claim 26, wherein:

the relief valve has an annular fixed end portion for receiving a front end of the attachment member forming the second end opening; and the recess portion is provided on the cylindrical wall between the protruding sealing portion and the annular fixed end portion.

30. The device of claim 20, wherein:

the relief valve has a check valve portion that prevents fluid flow from progressing into a fluid passage other than the second fluid passage when the second fluid passage is opened, the check valve portion being provided at a side opposite to the recess with respect to the attachment member.

31. The device of claim 20, wherein:

the relief valve has an annular fixed end portion for receiving a front end of the attachment member forming the second end opening; and the annular fixed end portion and the recess are provided at a radial outer side of the cylindrical wall of the relief valve.

32. An oil filter relief valve comprising:

an annular elastically deformable body having a radially outer surface and a radially inner surface with respect to a center axis thereof said body having an annular protrusion extending radially outwardly from the radially outer surface, an annular recess extending radially inwardly into the radially outer surface and located adjacent said protrusion, said protrusion and said recess thereby being directed to face an annular oil filter attachment member having oil relief passages therein which are normally obstructed by said body by which body elastically deforms away from said attachment member when oil pressure inside the filter becomes excessive.

* * * * *